Jan. 20, 1931.　　　C. E. TANNEWITZ　　　1,789,569
BAND SAW

Filed Nov. 21, 1929

INVENTOR
Carl E. Tannewitz
BY Chappell & Earl
ATTORNEYS

Patented Jan. 20, 1931

1,789,569

UNITED STATES PATENT OFFICE

CARL E. TANNEWITZ, OF GRAND RAPIDS, MICHIGAN

BAND SAW

Application filed November 21, 1929. Serial No. 408,721.

The main objects of this invention are:

First, to provide a band saw in which the saw dust is effectively discharged without the necessity for a separate blower or exhaust system.

Second, to provide in a band saw an exhaust or débris discharge means utilizing one of the band saw wheels as a rotor.

Third, to provide a structure having these advantages which is very simple and economical.

Objects pertaining to details and economies of my invention will definitely appear from the description to follow. The invention is defined in the claims.

A structure embodying the features of my invention is clearly illustrated in the accompanying drawing, in which.

Figure 1:
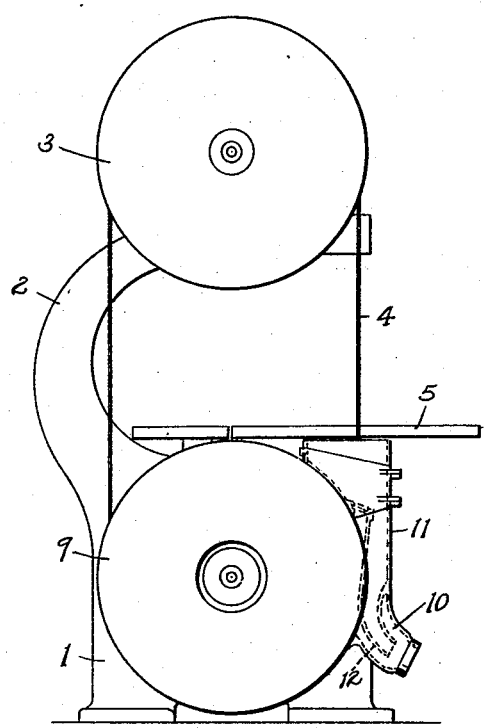
Fig. 1 is a side elevation of a band saw embodying the features of my invention, the parts being shown mainly in conventional form.
Figure 3:
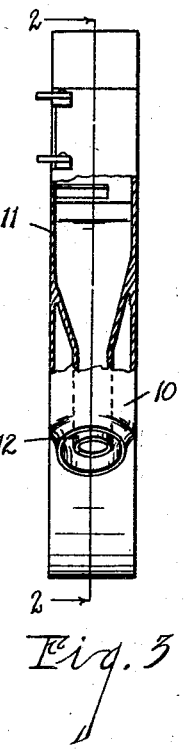
Fig. 3 is a fragmentary view partially in section on broken line 3—3 of Fig. 2.

Referring to the drawing, 1 represents the frame and 2 the overhanging pedestal carrying the housing 3 for the upper band saw wheel. The band saw is conventionally shown at 4.

The table 5 is provided with a slot or opening 6 for the band saw, the saw guide designated generally by the numeral 7 being located below the table. The lower band saw wheel 8 is provided with a housing 9 constituting a blower housing. The wheel 8 constitutes the rotor of the blower.

Figure 2:
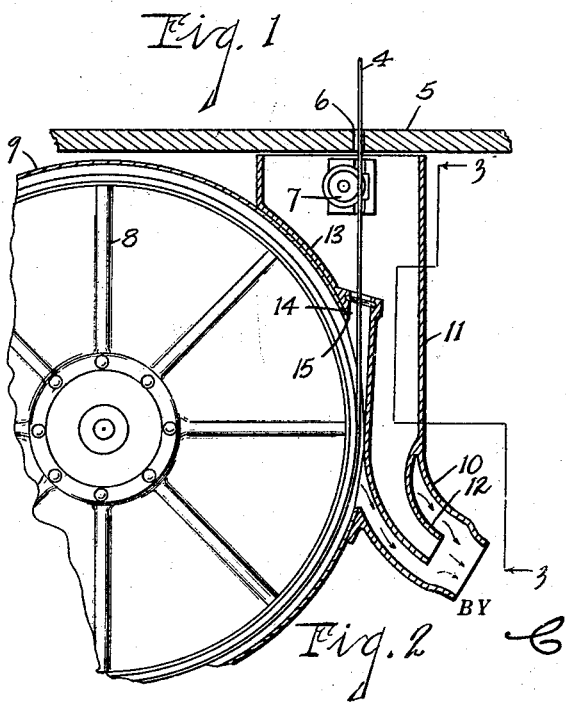
Fig. 2 is a fragmentary view mainly in vertical section on line 2—2 of Fig. 3.

The blower housing is provided with a nozzle 10 which in the embodiment shown in Figs. 1 and 2 is built into the débris conduit 11. This conduit has a nozzle 12 disposed concentrically within the nozzle 10 thereby providing an ejector for the débris conduit. The band saw wheel 8 is not only housed and protected by this housing 9 but constitutes an effective blower rotor so that the band saw is provided with an integral exhaust means, thereby avoiding the necessity of providing separate blowers or connecting the machine to an exhaust system.

In the embodiment illustrated the débris conduit 11 is provided with a segmental wall 13 seating upon the surface of the cylinder housing 9. The wall 13 has an opening 14 therein registering with an opening 15 in the housing 9.

Figure 4:
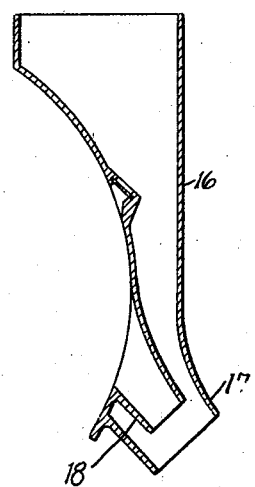
Fig. 4 is a vertical section of a modified form of débris conduit.

In Fig. 4 the débris conduit 16 has a discharge nozzle 17, the blower nozzle 18 being disposed within the nozzle 17 instead of surrounding it as shown in Fig. 2.

With this arrangement of parts I am able to utilize the blast of air created by the rotation of the band saw wheel in creating a temporary exhaust with the result of a very great saving in power and installation costs.

I have not attempted to illustrate and describe various other modifications and adaptations which I contemplate as it is believed that this disclosure will enable those skilled in the art to embody or adapt my improvements as may be desired.

Having thus described my invention what I claim as new and desire to secure by Letters Patent is:

1. The combination with a band saw including a table and a band saw wheel disposed below the table, of a housing for said band saw wheel constituting a blower casing and provided with a discharge nozzle, said band saw wheel constituting a blower rotor, and a débris conduit independent of the housing disposed below said table and provided with a nozzle associated with said blower nozzle to provide an ejector for said débris conduit.

2. The combination in a band saw, of a housing for one of the band saw wheels provided with a discharge nozzle, such band saw wheel and housing constituting a blower, and a débris conduit independent of the housing provided with a discharge nozzle operatively associated with said blower nozzle to provide an ejector for the débris conduit.

3. The combination in a band saw, of a housing for one of the band saw wheels cooperating therewith to provide a blower, and a débris conduit independent of the housing, said blower and débris conduit having concentrically disposed discharge nozzles cooperating to provide an ejector for said débris conduit.

4. The combination in a band saw, of a housing for one of the band saw wheels cooperating therewith to provide a blower, and a débris conduit for the band saw independent of said housing, said blower having a discharge acting to create a current of air in said débris conduit.

In witness whereof I have hereunto set my hand.

CARL E. TANNEWITZ.